United States Patent [19]

Crockwell

[11] 3,927,695

[45] Dec. 23, 1975

[54] SILICONE RUBBER HOSE
[75] Inventor: George Warren Crockwell, White Plains, N.Y.
[73] Assignee: Union Carbide Corporation, New York, N.Y.
[22] Filed: May 21, 1973
[21] Appl. No.: 362,286

[52] U.S. Cl. .................. 138/137; 428/36; 428/447; 428/424; 428/480
[51] Int. Cl.² ..................... F16L 11/08; F16L 11/06
[58] Field of Search ........... 138/125, 126, 132, 137, 138/141, 172; 161/139, 206, 208, 256; 260/827, 873; 117/138.8 F; 156/143, 144, 156/187, 188

[56] References Cited
UNITED STATES PATENTS

| | | | |
|---|---|---|---|
| 2,964,422 | 12/1960 | Bergstedt et al. ................ | 117/76 A |
| 3,030,223 | 4/1962 | Alstad .................... | 117/26 |
| 3,051,594 | 8/1962 | Aitken ........................... | 117/138.8 |
| 3,060,078 | 10/1962 | Atwell .......................... | 156/333 X |
| 3,197,326 | 7/1965 | Webber ........................ | 117/80 X |
| 3,296,047 | 1/1967 | Parr .............................. | 156/143 X |
| 3,318,750 | 5/1967 | Aitken ........................... | 156/331 |
| 3,342,780 | 9/1967 | Meyer et al. ................... | 260/75 |
| 3,425,866 | 2/1969 | Meyer et al. .................... | 117/218 |
| 3,426,098 | 2/1969 | Meyer et al. .................... | 260/33.4 R |
| 3,598,852 | 8/1971 | Berger ......................... | 260/448.2 E |
| 3,607,901 | 9/1971 | Berger ......................... | 260/448.2 N |
| 3,813,364 | 5/1974 | DeZuba ........................ | 260/375 B |

FOREIGN PATENTS OR APPLICATIONS

| | | |
|---|---|---|
| 1,068,020 | 5/1967 | United Kingdom |
| 7,204,788 | 10/1972 | Netherlands |

OTHER PUBLICATIONS

*RMA Handbook on Hose*, 3rd Edition, (Oct., 1970), Rubber Manufacturers Assn. Inc., New York.
*Triallyl Cyanurate*, Product Bulletin M–806, Ciba–Geigy, Plastics & Additives Division, Ardsley, New York.
*Talc*, Product Bulletin, (Aug., 1970), Allied Chemical, Plastics Division, Morristown, N.J.

Primary Examiner—George F. Lesmes
Assistant Examiner—Alan T. McDonald
Attorney, Agent, or Firm—Reynold J. Finnegan

[57] ABSTRACT

Reinforced silicone rubber hose comprising a reinforcing material of polyethylene terephthalate film and cured olefinic triazine modified silicone rubber directly bonded to the surface of said film; and a flexible polyethylene terephthalate film article having a coating of a heat-curable silicone gumstock composition containing an olefinic triazine compound.

10 Claims, No Drawings

SILICONE RUBBER HOSE

BACKGROUND OF THE INVENTION

This invention relates to novel reinforced silicone rubber articles. More particularly this invention relates to a novel reinforced silicone rubber hose article.

It is well known that in a number of instances the valuable properties of silicone rubber are often put to use when the rubber is reinforced with a reinforcing material, e.g. a glass or textile woven fabric, as in the manufacture of various rubber goods such as conveyor belts, jet starter ducts, electrical tapes, hoses, and the like. The instant invention is primarily directed to reinforced silicone rubber hoses.

The employment of a hose in order to convey materials, liquids, and/or gases is elementary. A hose generally consists of three elements which can be made of various materials depending upon the required strength and other characteristics desired. The three elements of a hose are the tube (lining), the reinforcement, and the jacket or outer cover. The tube is the innermost element of the hose and is generally made of rubber or plastic. Its primary function is to retain the materials, liquids, or gases or combinations thereof that are to be conveyed through the hose. The reinforcement is the middle element of the hose and is the reinforcing material, e.g. a textile fabric, built into the body of the hose so that the hose will withstand internal pressure or external forces or a combination of these. As defined herein and used hereafter the term reinforcement means the body of the hose including e.g. the rubber used in connection with the reinforcing material to provide bonding of the elements and complete the body of the hose. The jacket or cover is the outermost element of the hose. It is normally rubber but may be plastic or other materials and its prime function is to protect the reinforcement from outside damage or abuse. While the rubber employed in the tube, reinforcement and cover elements of conventional hoses may be the same generally at least two and sometimes three different types of rubber are employed.

Thus in general most hoses are conventionally manufactured by mounting a tube on a lubricated mandrel. For example, a seamless rubber tube is formed to the desired diameter and wall thickness by continuous extrusion of the desired rubber gumstock composition that is to serve as the tube element. Lubricants are generally injected into the tube as it is being formed to prevent the inner surface from sticking to itself and later in the process to keep the tube from adhering to the mandrel. In the case of silicone rubber, usually the tube is given an initial hot air vulcanization cure to give it enough strength to be either drawn over the mandrel or have the mandrel pushed through the tube, using air pressure to temporarily enlarge the tube. The reinforcement is generally made of several layers of a reinforcing material e.g. woven textile fabrics, cords, yarns or metal wires along with a rubber employed to complete the body of the hose and bond the elements. For example successive layers of a coated fabric material that has been calendered with a rubber gumstock composition may be wrapped around the tube on the mandrel. Additional layer coatings of an unsupported gumstock composition may also be applied to the tube between the fabric layers, and/or as the final layer of the reinforcement, if desired, to complete the body of the hose and help give its desired thickness and diameter. Alternatively, if desired the reinforcement may be formed by employing uncoated reinforcing materials and an unsupported rubber gumstock composition and forming successive layers or plies of same on the tube, e.g. a wrapping of woven fabric, a coating of rubber gumstock, another wrapping of woven fabric, etc., or a braided layer of yarn, a coating of rubber gumstock, another braided layer of yarn, etc. However, when the rubber of the reinforcement is silicone rubber one common factor applicable to all of the reinforcing materials be they fabrics, cords, yarns, or metal wires has been the general necessity to size or prime said materials or use a bonding agent to provide a bond between the reinforcing material and the silicone rubber. The jacket or cover of the hose, conventionally prepared by calendering a thin unsupported sheet of one or more plies of a rubber gumstock that has been interleaved with a release material, e.g. release paper, is wrapped around the hose carcass with a slight overlap, removing the interleave in the process. The prepared hose is then vulcanized to cure the rubber gumstock compositions. Generally the hose must be maintained under pressure to produce a solid homogeneous construction. The necessary pressure is conventionally maintained by means of cotton or nylon wrappings either in tape or sheet form that have been tightly wrapped around the hose for a number of turns. The finally wrapped hose is then vulcanized e.g. by placing it in an open steam autoclave under controlled conditions for the desired curing time and at the appropriate temperature and pressure. The cotton or nylon wraps are then stripped from the vulcanized hose product after cure and cool down prior to removal of the finished hose from the mandrel. The removal of the hose product from the mandrel is generally accomplished with the aid of compressed air or water under pressure injected between the hose tube and mandrel at one end.

SUMMARY OF THE INVENTION

It has now been discovered that reinforced silicone rubber articles, especially hoses, can be prepared by the instant invention using highly mechanized and improved methods of manufacture. It has been further discovered that a reinforced silicone rubber hose can be prepared which provides an improvement in all three construction element areas of heretofore conventional rubber hoses reinforced with fabrics, yarns or metal wires. For example, the reinforced silicone rubber hose of the instant invention does not require the use of a conventional rubber tube element, thus eliminating, if desired, the manufacturing steps of extruding and initially curing a rubber tube for the hose. In addition the reinforced silicone rubber hose of the instant invention does not require conventional textile woven fabrics, cords, yarns or metal wires as the reinforcing material for its reinforcement, nor is it necessary to size, prime, or use bonding agents to provide a bond between the reinforcing material and silicone rubber used to complete the body of the hose. Moreover the jacket or cover of the reinforced silicone rubber hose of the instant invention can be wrapped at high speeds resulting in an easier method of making and curing the cover of the hose.

Therefore it is an object of this invention to provide novel reinforced silicone rubber articles comprising a thermoplastic polymeric reinforcing material having silicone rubber directly bonded to the surface of said material. It is another object of this invention to provide a novel reinforced silicone rubber hose wherein the reinforced body of the hose comprises a thermoplastic polymeric reinforcing material having silicone rubber directly bonded to the surface of said material. A further object of this invention is to provide a novel reinforced silicone rubber hose as defined above that can be easily, quickly, and economically manufactured. Other objects and advantages of this invention will become readily apparent from the following description and appended claims.

More specifically the reinforced silicone rubber article of this invention comprises a thermoplastic polymeric reinforcing material, e.g. a terephthalate polyester, preferably polyethylene terephthalate in film (sheet) form, having a crosslinked silicone elastomer directly bonded to the surface of said material which is derived by curing a heat-curable silicone gumstock composition comprising (1) a crosslinkable diorganopolypiloxane gum (2) an olefinic triazine compound selected from the class consisting of cyanurates of the formula

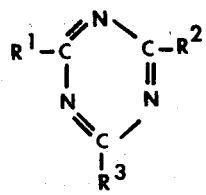

wherein R' and R² are hydrogen or a —O—R—CH=CH₂ radical and R³ is a —O—R—CH=CH₂ radical and R is an alkylene radical having from 1 to 4 carbon atoms, and isocyanurates of the formula

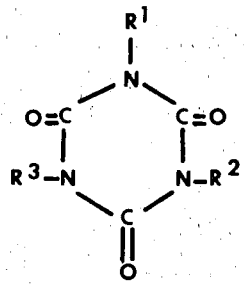

wherein R' and R² are hydrogen or a —R—CH=CH₂ radical, R³ is a —R—CH=CH₂ radical and R is the same as defined above and (3) a catalyst after said gumstock composition has been coated directly upon the surface of said reinforcing material. More preferably the reinforced silicone rubber article of this invention is a reinforced silicone rubber hose wherein the reinforced body of the hose comprises a thermoplastic polymeric reinforcing material having silicone rubber directly bonded to the surface of said material as defined above. For instance, in a silicone rubber hose containing a liner, reinforcement and cover element, the improvement wherein said reinforcement is polyethylene terephthalate in film form having a cured crosslinked, olefinic triazine modified silicone rubber directly bonded to at least one of the surfaces of said film, said rubber being derived by curing a heat-curable silicone gumstock composition comprising a crosslinkable diorganopolysiloxane gum; an olefinic triazine compound selected from the class consisting of cyanurates of the formula

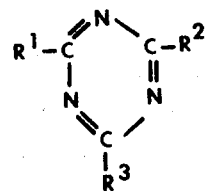

wherein R' and R² are hydrogen or a —O—R—CH=CH₂ radical and R is an alkylene radical having from 1 to 4 carbon atoms, and isocyanurates of the formula

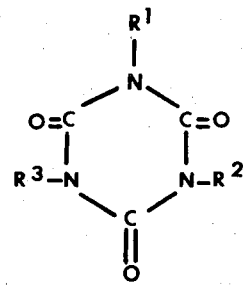

wherein R' and R² are hydrogen or a —R—CH=CH₂ radical, R³ is a —R—CH=CH₂ radical and R is the same as defined above; and a catalyst.

DESCRIPTION OF THE PREFERRED EMBODIMENTS

The heat-curable silicone gumstock compositions employed to produce the crosslinked silicone elastomers directly bonded to the reinforcing materials of the instant invention may be found fully described in the concurrently filed U.S. application Ser. No. 362,288 entitled "Self-Bonding Silicone Rubber Compounds" by D. Pittner (D-9381, now abandoned.

As pointed out therein the siloxane gum ingredient of said compositions is not critical and any conventional diorganopolysiloxane gum heretofore employed in producing silicone rubber can be used. Such siloxane gums as well as methods for their preparation are well known in the art as shown for example by U.S. Pat. Nos. 2,445,794; 2,803,619; 2,819,236; 2,954,357; 3,183,205; 3,219,726; and 3,696,068, the entire disclosures of which patents are incorporated herein by reference thereto. Such siloxane gums contain organo pendant groups and silicon atoms in the ratio of from about 1.95 to 2.05, preferably about 2, organo groups per silicon atom. Illustrative of the type of substituents that comprise said pendant groups are hydrogen, hydrocarbon radicals free of aliphatic unsaturation such as methyl, ethyl, amyl, phenyl, and the like, olefinic hydrocarbon radicals such as vinyl, allyl, cyclohexyl, and the like, halo-substituted hydrocarbon radicals such as bromo-, chloro- and fluoro-substituted methyl, propyl, butyl, and phenyl groups, and the like and cyano-substituted hydrocarbon groups such as cyanoalkyl radicals, and the like.

Preferably, the siloxane gums employed in this invention are those linear diorganopolysiloxane gums comprising diorganosiloxy units selected from the class consisting of dimethylsiloxy, diethylsiloxy, diphenylsiloxy, methylethylsiloxy, methylphenylsiloxy, ethylphenylsiloxy, cyanopropyl methylsiloxy, trifluoropropyl methylsiloxy, methylvinylsiloxy, ethylvinylsiloxy, phenylvinylsiloxy, divinylsiloxy, and the like. It is generally more preferred to employ those gums wherein about 0.02 to about 0.8 weight percent of the siloxy units in said gums are vinyl siloxy units, especially methylvinylsiloxy units. Specific examples of some of the more preferred siloxane copolymer gumstocks are a copolymer of dimethylsiloxy and methylvinylsiloxy units, a copolymer of diethylsiloxy and methylvinylsiloxy units, a terpolymer of dimethylsiloxy, diphenylsiloxy and methylvinylsiloxy units, a terpolymer of diethylsiloxy, dimethylsiloxy and methylvinylsiloxy units. Of course, it is to be understood that a single type of the siloxane gum species can be employed or if desired various combinations of different siloxane gums can be used to formulate the gumstock that is to be cured into the elastomeric product and that the end-blocking organo groups are insignificant as compared with the total numbers of organo groups attached to the silicon atoms of the polysiloxane chains in the gumstocks which normally have viscosities well in excess of 200,000 centistokes at 25°C.

The olefinic triazine compounds that are present as the second essential ingredient of the heat-curable gum compositions are those cyanurates and isocyanurates depicted and described above. Such compounds and/or methods for their preparation are well known in the art.

Illustrative examples of such cyanurate compounds include triallyl cyanurate [i.e. 2,4,6-tris(allyloxy)-s-triazine], tris(2-vinylethyl)cyanurate, tris(2-vinylpropyl)cyanurate, tris(3-vinylpropyl)cyanurate, tris(4-vinylbutyl)cyanurate, diallyl cyanurate, monoallyl cyanurate, and the like. Illustrative examples of such isocyanurate compounds include triallyl isocyanurate [i.e. 1,3,5-tris(allyl)-s-isocyanurate], tris(2-vinylethyl)isocyanurate, tris(2-vinylpropyl) isocyanurate, tris(3-vinylpropyl)isocyanurate, tris-(4-vinylbutyl)isocyanurate, diallyl isocyanurate, monoallyl isocyanurate, and the like. Of course it is to be understood that a single olefinic triazine compound can be employed or if desired, mixtures of different cyanurates or isocyanurates as well as mixtures of a cyanurate and an isocyanurate can be used. Preferably the olefinic triazine compound is either triallyl cyanurate or triallyl isocyanurate.

The heat-curable silicone gumstock compositions employed in this invention also contain a catalytic amount of a catalyst. Any suitable conventional catalyst heretofore employed in producing silicone rubber may be used. Illustrative examples of such catalysts include the organic peroxide curing agents such as, di-t-butyl peroxide; t-butyl, triethylmethylperoxide; t-butyl-t-triptyl peroxide, dicumyl peroxide, benzoyl peroxide, t-butylperbenzoate, 1,4-dichlorobenzoyl peroxide; 2,4-dichlorobenzoyl peroxide, monochlorobenzoyl peroxide, 2,5-dimethyl-2,5-di(t-butylperoxy)hexane, and the like. Moreover, any single catalyst or mixtures of two or more different catalysts can be employed. Such curing agents and the amounts generally used are well known and described in the prior art.

Of course the siloxane gum, olefinic triazine and catalyst can be mixed in any manner or order. The amount of olefinic triazine employed can range from about 0.2 to about 5 parts by weight per 100 parts by weight of the crosslinkable diorganopolysiloxane gum used, while amounts of from about 0.4 to about 2.0 parts by weight per 100 parts by weight of gum will generally be sufficient for most purposes.

Moreover, it is generally preferred and desirable to add a filler to the heat-curable gumstock composition to give substance and body to the crosslinked elastomer product. The nature of the filler is also not critical and any conventional filler heretofore employed in producing silicone rubber can be used. Such fillers are also well known in the art. Illustrative examples of such conventional fillers are carbon black, silica base fillers such as, pyrogenic silica, precipitated filler, fumed silica, silica gel, and the like, inorganic fillers such as diatomaceous earths, clay, calcium carbonate, titania, iron oxide, zinc oxide, aluminum oxide, and the like. Of course, the fillers can be employed individually or in combination with one another. Generally, it is preferred to employ finely divided silica base fillers of the highly reinforcing type either alone or in combination with inorganic fillers. The amount of filler, when used, that is present in the siloxane gumstock composition merely depends on the ultimate elastomer product desired. Generally amounts of filler from about 10 to about 200 parts by weight based on the weight of the siloxane gum employed will be sufficient for most purposes.

It should also be understood that the heat-curable siloxane gumstock compositions, if desired, can contain other conventional silicone rubber additives which do not effect the instant invention or its basic purpose, such as pigments, dyestuffs, antioxidants, thermal stabilizers, oxide accelerators or retardants, die "B" tear additives, and the like.

For example, in many instances it is desirable and preferable to add a small amount of a linear dihydrocarbon polysiloxane oil selected from the group consisting of hydroxy and/or alkoxy end-blocked (terminated) polysiloxanes or amino end-blocked polysiloxanes, or mixtures of such oils. Such siloxane oils containing hydroxy and/or alkoxy or amino groups bonded to each the terminal silicon atoms of the siloxane are well known in the art and can often be used to help plasticize the gumstock composition and/or prevent bin-age stiffening of the siloxane gum prior to curing same, such oils are disclosed for example by U.S. Pat. No. 2,954,357, Belgium Pat. No. 534,217 and U.S. Pat. No. 3,467,686.

Such siloxane oils generally have a weight average molecular weight of from about 400 to about 2700 (grams/mole) preferably about 600 to about 1500 and contain terminal alkoxy and/or hydroxy or amino groups in an amount by weight of from about 2 to 25 percent preferably about 8 to 20 percent. Among the more preferred siloxane oils are linear dimethylsiloxanes end-blocked with ethoxy and/or hydroxy or dimethylamino groups having from 4 to 35 or more (preferably about 8 to 20) dimethylsiloxy units per molecule and having an average of from 1 to 1.5 ethoxy and/or hydroxy or dimethylamino groups bonded to each of the terminal silicon atoms thereof. When employed, amounts of such siloxane oils are not narrowly critical and usually range from about 4 to about 50 parts by weight per 100 parts by weight of the siloxane gum employed, although lower or higher amounts can be employed if desired.

It has been discovered that the above described heat-curable silicone gumstock compositions when cured in contact with a thermoplastic polymeric material, such as terephthalate polyesters, e.g. polyethylene terephthalate (Mylar), poly-p-xylylenes, e.g. poly-p-xylylene (Parylene N), poly-monochloro-p-xylylene (Parylene C), poly-dichloro-p-xylylene (Parylene D), and the like, form a crosslinked siloxane elastomer that self-bonds tenaciously to the polymeric material. Moreover the thermoplastic material does not have to have been previously sized, primed or coated with a bonding agent in order to obtain said bond.

Accordingly one feature of the instant invention consists of any reinforced cured silicone rubber article that can be prepared from a flexible polyethylene terephthalate film (sheet or tape) form having directly coated on at least one surface of said film a heat-curable silicone gumstock composition as defined above. Such films may be coated with the curable gum composition by any conventional manner, the preferred method being to calender the gum composition onto the film. Such flexible coated polyethylene terephthalate films have a wide range of utility. They are especially suitable for preparing reinforced silicone rubber hoses as explained more fully below. In addition since the cured silicone rubber derived from curing the gumstock coated polyethylene terephthalate films of this invention bond extremely well to conventional cured silicone rubber, they can be used to provide the outer cover of a conventional silicone rubber hose or tube, to provide reinforcement for and as a protective barrier to prevent attack to conventional silicone rubber articles (e.g. a diaphram) by chemicals, liquids or gases, to provide light weight backings for conductive silicone rubber articles to bleed off static charges, and the like. Moreover, they can be used to make electrical sleeving, weather balloons, tank and pool linings, high and low temperature belts e.g. engine fan belts, and in any number of other areas. The size or shape of the flexible coated polyethylene terephthalate film of this invention or the thickness of the coating is obviously not critical and merely depends on the ultimate use desired for said coated film.

Another feature of the instant invention consists of a reinforced silicone rubber hose wherein the body of the hose comprises a thermoplastic polymeric reinforcing material having a crosslinked siloxane elastomer directly bonded to the surface of the material which is derived by curing a heat-curable silicone gumstock composition as defined above after said gumstock composition has been coated directly upon the surface of said reinforcing material.

Preferably the reinforcing material employed in the hoses of this invention is a terephthalate polyester especially polyethylene terephthalate. While the polyethylene terephthalate reinforcing material can be employed in any form e.g. as woven textile fabric, braided yarn, etc. most preferably it is employed in film (sheet or tape) form, e.g. Mylar.

While the silicone rubber hoses of this invention that employ polyethylene terephthalate as the reinforcing material are unique in that said material does not require sizing, priming or a bonding agent to help provide the bond for the silicone rubber to said material, the silicone rubber hoses of this invention that employ polyethylene terephthalate in film (sheet or tape) form as the reinforcing material are even more unique and represent an even greater advancement in the art.

Thus the instant invention encompasses a great variety of silicone rubber hoses having different constructions. Illustrative examples of such silicone rubber hoses wherein the cured silicone rubber employed in the body of the hose is derived from the olefinic triazine containing gum compositions defined herein include, hoses comprising (1) a conventional tube element, e.g. an extruded silicone rubber tube, etc., or those hoses without a conventional tube element, e.g. hoses wherein the inside wall (liner) of the hose consists of a barrier of polyethylene terephthalate in film (sheet or tape) form or tube form, or a barrier of conventional fusible, cured silicone rubber tape (as disclosed e.g. in U.S. Pat. No. 3,146,799); (2) a reinforcement element wherein the reinforcing material of the reinforcement is a conventional reinforcing material, e.g. a wrapping of woven or braided polyethylene terephthalate, or a metal wire, or more preferably those hoses wherein the reinforcing material is not heretofore conventional, e.g. a wrapping of polyethylene terephthalate film (sheet or tape) (3) a conventional cover element, e.g. a supported organic rubber or plastic, etc., or those hoses without a conventional cover element, e.g. hoses wherein the outside wall of the hose consists of a barrier of polyethylene terephthalate in film (sheet or tape) form or tube form, or a barrier of conventional fusible, cured silicone rubber tape. Thus if desired the silicone rubber hose of this invention can consist essentially of only a series of layers of polyethylene terephthalate film (Mylar) and the crosslinked cured silicone rubber derived from the olefinic triazine containing gum compositions defined herein.

The particular method of manufacture of the silicone rubber hoses of this invention is not critical and any of the conventional well known methods and operations heretofore employed in the art can be used, the particular method used obviously depending only on the type of hose desired, its desired ultimate end use, the volume of production desired, and the like. By way of illustration, conventionally extruded and cured silicone rubber may be wrapped around or forced over a mandrel to form the tube element. If the inner wall of the hose is to be a terephthalate tube it may be forced over the mandrel, if it is to be a terephthalate film (sheet or tape) or a conventional fusible silicone rubber tape it need be simply wrapped around the mandrel. If the terephthalate film is used in its coated form (i.e. coated with the curable olefinic triazine containing gum compositions defined herein) instead of uncoated, the uncoated side of the terephthalate film should be applied to the mandrel so that the cured silicone rubber does not bond to the mandrel. The body of the hose can easily be built up by forming a series of layers of reinforcing material and the curable olefinic triazine containing gum composition defined herein, e.g. a layer wrapping or braiding of uncoated polyethylene terephthalate in woven or film form, a layer of calendered curable gum composition as defined herein, etc., of more preferably by simply wrapping the desired number of layers of polyethylene terephthalate film coated with the curable olefinic triazine containing gum composition as defined herein. The cover element if conventional can of course be applied to the hose carcass in any known matter. Of course if the outer cover is to be polyethylene terephthalate film no further procedural step for the cover is necessary since said film outer wrapping can be arranged by using the same coated film used to build up the body of the hose. Of course it is to be further understood that an identification marking can also be added to the hose carcass by any conventional manner and such is normally desirable since it not only provides an identification means, but is used to prevent twisting of the hose if it is to be installed, e.g. as part of an automotive engine. Such markings are conventional and normally take the form of different colored rubber or fabric liners or stripes or aluminum metal tapes, and the like. Moreover, heretofore known methods of maintaining the hose carcass under pressure during the curing operation such as by wrapping the carcass with a sacrifice tape of cotton or nylon can be employed herein but such is not necessary when the outer cover of the silicone rubber hose of this invention is made of polyethylene terephthalate film (sheet or tape) or a conventional fusible, cured silicone rubber tape. Finally, the method of vulcanizing or curing the hose is not critical and any procedure heretofore employed in the hose art can be used. Briefly the preferred procedure merely involves steam heating the hose while still attached to the mandrel in an autoclave to crosslink the heat-curable gumstock composition employed in making the hose into a cured siloxane elastomer and to produce a solid homogeneous construction. The time, temperature and pressure of the operation is not critical and will of course vary with the construction of the hose. Normally steam heating the hose for 5 to 15 minutes, at temperatures ranging from about 230°F. to 350°F. and at pressures of about 10 to 100 p.s.i.g. to equal said temperatures should be sufficient. The hose product can then be removed from the mandrel by any conventional removal method after cool down and is then ready for use.

The preferred method of making the silicone rubber hoses of this invention involves the use of polyethylene terephthalate film coated with the curable olefinic triazine containing gum compositions as defined herein. The use of such a coated flexible film is unique in that it provides an extremely fast and economical method for producing reinforced silicone rubber hoses. It allows the manufacturer of the hose to employ high speed wrapping machines and to produce a hose in an essentially continuous one-step operation thereby eliminating many of the procedures and steps heretofore employed in making conventional hoses as already explained herein. Moreover, the coated film possesses a long shelf-life and can be stored for a prolonged period of time without adversely affecting the bonding properties of the cured rubber derived therefrom for the polyethylene terephthalate film. In one instance the silicone rubber employed herein was found to cause a good bond to polyethylene terephthalate film even after the curable gum composition had been stored for about seven months.

Of course it is to be further understood that the number of plies of the various materials used to prepare the silicone rubber hoses of this invention, their angle of wrapping, their thickness, their configuration, the diameter of the final hose, and all such other physical properties of the hose are not critical and will depend essentially only upon the type of hose desired and its end use.

The silicone rubber hoses of the instant invention wherein the reinforcing material is a polyethylene terephthalate film have any number of beneficial properties. For instance they are not permeable due to the terephthalate film sheets employed and thus are excellent carriers for liquid and gaseous materials where the leakage of same might be detrimental. They are also excellent for low and high temperature applications, e.g. in the aircraft industry, refrigerant systems, and in the automotive field for all types of motor vehicles, such as cars, trucks, off-the-road vehicles, etc., as radiator, heater coolant, or vacuum hoses, and the like. When the reinforcing terephthalate film sheets are used as the liner or outer cover of the silicone rubber hoses of the instant invention said sheets act as barriers to prevent attack to the silicone rubber by chemicals, liquids or gases that might be carried inside the hose or present in the environment in which the hose is employed. Those hoses having silicone rubber as the inside wall of the hose are inert, non-toxic and non-allergic and therefore should not impart any detrimental effect to the materials, chemicals, liquids, or gases that they might carry. Moreover the silicone rubber hoses of this invention can range from flexible to very stiff, almost pipe like structures and in relation to heretofore conventional hoses the silicone rubber hoses of this invention can be obtained having an improved strength with a decrease in total wall thickness.

The following examples are illustrative of the present invention and are not to be regarded as limitative. It is to be understood that all of the parts, percentages and proportions referred to herein, in said examples and in the appended claims are by weight unless otherwise indicated.

EXAMPLE 1

A 3 inch outside diameter aluminum pipe mandrel was cleaned, dried and lubricated with a soap solution. The pipe was then spirally wrapped with two layers of 20 mil, 1-inch wide commercially available cured fusible silicone rubber tape which is triangular in shape and contains a guideline. Over this was spirally wrapped four successive plies of a 1 mil, 1-inch wide polyethylene terephthalate film (Mylar) coated on one side with a heat-curable silicone gumstock composition said composition containing about 100 parts of a polydimethylsiloxane gum having an average molecular weight of about 500,000 grams/mole and containing about 0.2 weight percent of methylvinylsiloxy units, about 40 parts of fumed silica filler, about 7 parts of precipitated silica filler, about 16 parts of a linear ethoxy terminated dimethylsiloxane oil having the average formula $C_2H_5O[Si(CH_3)_2O]_9C_2H_5$, about 0.1 parts of stannous octoate, about 0.25 parts of a blue pigment paste, about 0.1 parts of a white pigment paste, about 1.5 parts of triallyl cyanurate and about 0.3 parts of 2,5-dimethyl-2,5-di(t-butylperoxy)hexane catalyst. Each sheet of said flexible coated film was wrapped so that each successive wrap slightly overlapped the previous wrap, the first ply being applied so that the curable gum composition was contacted with the fusible silicone rubber tape and that the outer layer of the four plies would be polyethylene terephthalate film. The total thickness of the four plies of said flexible coated film was about 15 mils. A cover consisting of a final wrapping of two layers of the same cured, fusible silicone rubber tape employed as the inner liner was then wound around the hose carcass. The hose so produced was then placed in a preheated steam autoclave and cured for about 5 minutes to about 340°F. using about 100 p.s.i.g. of steam pressure while still on the mandrel. The desired cured reinforced silicone rubber hose product was removed from the autoclave, cooled to room temperature, removed from the mandrel, had the rust from the autoclave washed from its surface and was then ready for use.

The above example represents the production of a reinforced silicone rubber hose having a blue color that is suitable for high and low temperature applications, that is non-permeable to gas and which was made without an extruded liner, without using a fabric or metal for reinforcement and without using a sacrifice tape during curing.

EXAMPLE 2

A clean solid steel rod having a 13/16th inch diameter employed as a mandrel was spirally wrapped with a layer of the same 20 mil 1-inch grey, cured, fusible silicone rubber tape employed in Example 1. Over this was wrapped a 3 mil 1-inch wide polyethylene terephthalate film (Mylar) one side of which had been calendered with 60 mils of heat-curable silicone gumstock composition said composition containing about 100 parts of a polydimethylsiloxane gum having an average molecular weight of about 500,000 grams/mole and containing about 0.2 weight percent of methylvinylsiloxy units, about 40 parts of fumed silica filler, about 7 parts of precipitated silica filler, about 16 parts of a linear ethoxy terminated dimethylsiloxane oil having the average formula $C_2H_5O[Si(CH_3)_2O]_9C_2H_5$, about 0.1 parts of stannous octoate, about 2 parts of a mixture of about 35 percent of a polydimethylsiloxane gum having a weight average molecular weight of about 500,000 grams/mole and about 65 percent of red iron oxide powder, about 1.5 parts of triallyl cyanurate and about 0.3 parts of 2,5-dimethyl-2,5-di(t-butylperoxy)-hexane catalyst. The coated film wrap was applied so that the curable gum composition was contacted with the fusible silicone rubber tape and that the outer layer of the wrap was the polyethylene terephthalate film. Next 60 mils of the same but unsupported, heat-curable siloxane gum composition in calendered sheet form were physically wrapped on the polyethylene terephthalate film and butted with the excess trimmed off to build up the hose carcass. Then one spiral wrapping of the same cured, fusible silicone rubber tape employed as the inner liner was applied to furnish the hose carcass with an outer cover, with the guideline of the tape showing evenly on the outside. The desired cured reinforced silicone rubber hose product was then obtained by following the same curing and recovery procedures described in Example 1.

The above example represents the production of a reinforced silicone rubber hose having a red color that is suitable for high and low temperature applications and that is non-permeable to gas.

EXAMPLE 3

A heat-curable siloxane gumstock composition, said composition containing about 100 parts of a polydimethylsiloxane gum having an average molecular weight of about 500,000 grams/mole and containing about 0.2 weight percent of methylvinylsiloxy units, about 40 parts of fumed silica filler, about 7 parts of precipitated silica filler, about 16 parts of a linear ethoxy terminated dimethylsiloxane oil having the average formula $C_2H_5O[Si(CH_3)_2O]_9C_2H_5$, about 0.1 parts of stannous octoate, about 2 parts of a mixture of about 35 percent of a polydimethylsiloxane gum having a weight average molecular weight of about 500,000 grams/mole and about 65 percent of red iron oxide powder, and about 1.1 parts of 2,4-dichlorobenzoyl peroxide catalyst was extruded into a tube having a 13/16th inch inside diameter and an 80 mil wall thickness. The extruded tube was hot air vulcanized for 90 seconds at 700°F. During the cure it was held in a cradle made from aluminum foil to insure the concentricity of the tube. The cured silicone rubber tube after cooling was slipped onto a soap solution (motel bar size of Ivory soap dissolved in a quart of water) lubricated 13/16th inch steel rod employed as the mandrel. Fifteen mils of the same heat-curable triallyl cyanurate containing siloxane gum composition as defined in Example 1 was calendered onto one side of a 1 mil polyethylene terephthalate (Mylar) sheet of film. Three successive plies of 1-inch wide strips of the above coated film were spirally wrapped over the tube on the mandrel at about a 22° angle to the axis of the mandrel with a slight overlap on each wrap. Each wrapping of the coated film was made with the coated curable gum side of the film down (facing the mandrel), the second wrap being diametrically opposed to the first wrap and the third wrap being diametrically opposed to the second wrap. Next 60 mils of the same but unsupported heat-curable triallyl cyanurate containing siloxane gum composition in calendered sheet form were hand wrapped around the carcass of the hose and butted with the excess trimmed off. Then an embossed ½ inch wide, thin aluminum strip was laid along the outside of the hose parallel to its axis. This strip serves both as an identification marker for the hose and as a means to indicate whether the hose had been twisted when installed in its final use. Finally the hose was double wrapped with a wet sacrifice cotton duck tape. The hose so produced was then placed in a preheated steam autoclave and cured for about 5 minutes at about 340°F. using 100 p.s.i.g. of steam pressure while still on the mandrel. The desired cured reinforced silicone rubber hose product was removed from the autoclave, cooled to room temperature, removed from the mandrel, had the cotton sacrifice tape removed and was then ready for use.

The above example represents the production of a reinforced, high and low temperature silicone rubber hose made in the conventional manner except that no metal or fabric was used for the reinforcement. The tube of the hose had a red color while its silicone rubber body had a blue color. The aluminum identification strip was tenaciously bonded to the hose.

EXAMPLE 4

This example represents the production of a reinforced silicone rubber hose using conventional silicone rubber and conventional Dacron fabric for the reinforcement. It is a control example and does not represent the production of a hose of the instant invention.

Example 3 was repeated using the same materials and procedural conditions save for the following differences. This time 12 mils of a conventional heat-curable siloxane gum composition free of triallyl cyanurate was calendered onto an open weave Dacron fabric and rolled up with an interleave. Three successive plies of said coated fabric were circumferentially wrapped around the tube on the mandrel, the interleave being removed as the wrapping was made. Next 60 mils of the same conventional curable gum composition calendered on an unsupported interleave sheet were wrapped over the three plies of coated Dacron fabric (while removing the interleave) to provide a jacket for the hose produced to this point. Moreover, instead of the cotton sacrifice tape employed in Example 4, a spirally wrapped 1 mil, 1-inch wide polyethylene terephthalate tape with a slight overlap was used as the sacrifice tape.

Neither the polyethylene terephthalate tape nor the embossed aluminum identification strip employed had any bond to the cured reinforced silicone rubber hose product obtained. Moreover the hose product obtained felt more flimsy to the touch than the hoses produced in Examples 1, 2 and 3. The hose obtained did not have any barrier in the wall to prevent gas leakage should it be used for this purpose, nor would this type of hose construction lend itself to the use of high speed taping machines during its building steps.

EXAMPLE 5

A 1 mil thick polyethylene terephthalate tape, 1-inch wide was wrapped on a clean 13/16th inch diameter steel mandrel that had been given a light Teflon spray for release. The tape was spirally wrapped with a slight overlap. Thirteen mils of the same heat-curable triallyl cyanurate containing siloxane gum composition as defined in Example 1 were calendered onto one side of a 1 mil polyethylene terephthalate sheet of film (Mylar). Three successive plies (layers) of 1-inch wide strips of the above calendered film were then spirally wrapped in the same manner as described in Example 3 over the uncoated polyethylene terephthalate tape initially wound around the mandrel. Next 130 mils of the same but unsupported heat-curable triallyl cyanurate containing siloxane gum composition in calendered sheet form were physically wrapped around the hose made to this point and butted with the excess trimmed off. Then a 1-inch wide strip of Dacron that had been calendered on one side with the same heat-curable triallyl cyanurate containing siloxane gum composition was laid on the outside of the hose prepared to this point. The strip was applied parallel to the axis of the mandrel and to serve as an indicator as to whether the hose might be twisted when it is in its final clamped, application use. The hose was then wrapped with a wet cotton duck, sacrifice tape. The desired cured reinforced silicone rubber hose product was then obtained by following the same curing and recovery procedures described in Example 3.

The above example represents the production of a blue, reinforced silicone rubber hose that is suitable for high and low temperature applications and that has an inner liner made of polyethylene terephthalate thereby providing a barrier between the materials, liquid or gases used in the hose application and the silicone rubber.

EXAMPLE 6

A 3 inch outside diameter aluminum pipe mandrel was clean, dried and lubricated with a soap solution. Forty-five mils of the same heat-curable triallyl cyanurate containing siloxane gum composition as defined in Example 1 were calendered onto one side of a 1 mil polyethylene terephthalate film (Mylar), 1 and ⅛ inch wide. The calendered polyethylene terephthalate film tape was then spirally wrapped on the aluminum mandrel with the uncoated polyethylene terephthalate side down (facing the mandrel). A second layer of the same calendered polyethylene terephthalate tape was wrapped around the first wrapping, however this time the uncoated side of the polyethylene terephthalate tape was up (facing away from the mandrel) so it would form the outside of the hose. As this second wrapping was being made, pressure was applied exerting tension on the winding. This gave enough exerted pressure to the construction so that no sacrifice tape was needed on the outside of the hose during its curing procedure. The desired cured reinforced silicone rubber hose product was then obtained by following the same curing and recovery procedures described in Example 1.

The above example represents the production of a blue reinforced silicone rubber hose that is suitable for high and low temperature applications and whose inner and outer wall is made of polyethylene terephthalate film.

Various modifications and variations of this invention will be obvious to a worker skilled in the art and it is to be understood that such modifications and variations are to be included within the purview of this application and the spirit and scope of the appended claims.

What is claimed is:

1. In a silicone rubber hose consisting essentially of a liner, reinforcement and cover element, the improvement wherein said reinforcement is polyethylene terephthalate in film form having a cured crosslinked, olefinic triazine modified silicone rubber directly bonded to at least one of the surfaces of said film, said rubber being derived by curing a heat-curable silicone gumstock composition comprising a crosslinkable diorganopolysiloxane gum; an olefinic triazine compound selected from the class consisting of cyanurates of the formula

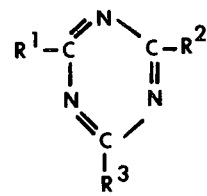

wherein $R^1$ and $R^2$ are hydrogen or a $-O-R-CH=CH_2$ radical and $R^3$ is a $-O-R-CH=CH_2$ radical and R is an alkylene radical having from 1 to 4 carbon atoms, and isocyanurates of the formula

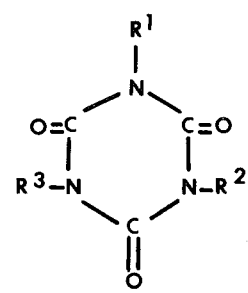

wherein $R^1$ and $R^2$ are hydrogen or a $-R-CH=CH_2$ radical, $R^3$ is a $-R-CH=CH_2$ radical and R is the same as defined above; and a catalyst.

2. A reinforced silicone rubber hose as defined in claim 1, wherein the liner of the hose is made from a material selected from the class consisting of (a) polyethylene terephthalate in film or tube form, (b) cured, fusible silicone rubber tape and (c) a cured tube of extruded silicone rubber, and wherein the cover element of the hose is made from a material selected from the class consisting of (a) polyethylene terephthalate in film or tube form, (b) cured, fusible silicone rubber tape and (c) an unsupported, calendered sheet of a heat-curable silicone gumstock composition.

3. A reinforced silicone rubber hose as defined in claim 1, wherein the liner of the hose is made from polyethylene terephthalate in film or tube form, and the olefinic triazine is triallyl cyanurate.

4. A reinforced silicone rubber hose as defined in claim 1, wherein the liner of the hose is made from a cured, fusible silicone rubber tape, and the olefinic triazine is triallyl cyanurate.

5. A reinforced silicone rubber hose as defined in claim 1, wherein the liner of the hose is made from a cured tube of extruded silicone rubber, and the olefinic triazine is triallyl cyanurate.

6. A reinforced silicone rubber hose as defined in claim 1, wherein the olefinic triazine is triallyl cyanurate.

7. A reinforced silicone rubber hose as defined in claim 1, wherein the olefinic triazine compound is triallyl isocyanurate.

8. A reinforced silicone rubber hose as defined in claim 6, wherein both the liner and the cover element of the hose are made from polyethylene terephthalate in film or tube form.

9. A reinforced silicone rubber hose as defined in claim 6, wherein the liner of the hose is made from a cured fusible silicone rubber tape and the cover element of the hose is made from polyethylene terephthalate in film or tube form.

10. A reinforced silicone rubber hose as defined in claim 6, wherein the liner of the hose is made from a cured tube of extruded silicone rubber and the cover element of the hose is made from polyethylene terephthalate in film or tube form.

* * * * *

UNITED STATES PATENT OFFICE
CERTIFICATE OF CORRECTION

Patent No. 3,927,695          Dated December 23, 1975

Inventor(s) G. W. Crockwell

It is certified that error appears in the above-identified patent and that said Letters Patent are hereby corrected as shown below:

Col. 3, line 19, "ganopolypiloxane" should be ---ganopolysiloxane.

The symbol "$R^1$" in each of the formulas in col. 3, lines 25-30 and 40-50; col. 4, lines 5-15 and 20-35; and col. 14, lines 35-45 and 55-65 should be ---R'--- in each instance.

Col. 4, line 49 "(D-9381" should be ---(D-9381)---.

Signed and Sealed this

Twenty-first Day of September 1976

[SEAL]

Attest:

RUTH C. MASON
*Attesting Officer*

C. MARSHALL DANN
*Commissioner of Patents and Trademarks*